(12) United States Patent
Jaimes et al.

(10) Patent No.: US 6,467,706 B1
(45) Date of Patent: Oct. 22, 2002

(54) METHOD FOR RECYCLING EXPANDED POLYMERS

(75) Inventors: Juan Carlos Uribe Jaimes, Aguascalientes (MX); Ramiro Olvera Oropeza, Aguascalientes (MX); Carlos Ocadiz, Aguascalientes (MX); Javier Juarez, Aguascalientes (MX)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,344

(22) Filed: Nov. 29, 1999

(51) Int. Cl.$^7$ ................................. B02C 19/12
(52) U.S. Cl. ................ 241/18; 241/23; 241/24.28
(58) Field of Search .................. 241/18, 23, 24.28, 241/65

(56) References Cited

U.S. PATENT DOCUMENTS

| | | | |
|---|---|---|---|
| 4,260,394 A | * | 4/1981 | Rich |
| 5,217,660 A | | 6/1993 | Howard |
| 5,358,119 A | | 10/1994 | Stahl et al. |
| 5,462,233 A | | 10/1995 | Isao et al. |
| 5,595,349 A | | 1/1997 | Bergstrom et al. |
| 5,629,352 A | | 5/1997 | Shino et al. |
| 5,935,536 A | | 8/1999 | Badger et al. |

FOREIGN PATENT DOCUMENTS

| | | |
|---|---|---|
| DE | 195 17 210 A1 | 11/1996 |
| DE | 195 28 284 A1 | 2/1997 |
| EP | 0 493 018 A1 | 7/1992 |

* cited by examiner

*Primary Examiner*—Mark Rosenbaum
(74) *Attorney, Agent, or Firm*—Oliff & Berridge, PLC

(57) ABSTRACT

A process for recovering thermoplastic polymer particles from an expanded thermoplastic polymer material includes grinding the expanded thermoplastic polymer material in a grinding chamber under elevated temperature while feeding ionized gas through the grinding chamber during the grinding. An apparatus for recovering the thermoplastic polymer particles from the expanded thermoplastic polymer material includes a grinding chamber into which the expanded thermoplastic polymer material is introduced, the grinding chamber having grinding components therein, one or more inlet passages at a bottom potion of the grinding chamber for entry of ionized gas, and optionally also for entry of hot gas, and one or more outlet passages at a top portion of the grinding chamber for exit of gases from the grinding chamber. The process and apparatus provide a cost-effective mechanical process for compacting expanded polymers, particularly expanded polystyrene, and eliminates the use of solvents in compaction and the problems associated with such solvents.

13 Claims, 2 Drawing Sheets

METHOD FOR RECYCLING EXPANDED POLYMERS

BACKGROUND OF THE INVENTION

1. Field of the Invention

This invention relates to a method for recycling expanded polymers, particularly expanded thermoplastic polymers, more particularly expanded polystyrene polymers.

2. Discussion of Related Art

Expanded synthetic polymeric resins are widely utilized for fabricating packaging and packing products, as well as numerous other uses such as building materials, etc. When objects and materials contained in packaging and packing products are utilized, the packaging and packing products are discarded. If these products are merely disposed in landfills, they are lost for subsequent recovery of the constituent material. Furthermore, disposal in landfills is objectionable since such products, as is typical with synthetic resins generally, are of low density and occupy inordinate volume within a landfill.

It is thus desirable to recover the expanded materials in a form rendering the material suitable for reuse into other products, including being reformed into additional packaging. Several recycling methods of these expanded materials have been developed.

U.S. Pat. No. 5,935,536 describes an apparatus and method for reclaiming expanded synthetic resin wastes in a form suitable for subsequent injection molding. The apparatus includes a tank containing a solvent having a pump for pumping dissolved resin wastes to an evaporator. The evaporator comprises an endless belt on which dissolved resin waste is deposited and precipitates in the form of a thin film. A heater is disposed below the belt to expedite separation of solute and solvent by evaporation. A blower disposed within a housing enclosing the endless belt establishes air circulation over the belt, further promoting evaporation. The thin film is wound on a roller and subjected to a heated roller to fuse the many thin film strata into a solid, generally cylindrical mass. The solid mass is then comminuted by a granulator. Evaporated solvent is recovered in a condenser and is reused.

U.S. Pat. No. 5,629,352 describes a solvent for polystyrene having an excellent dissolving ability and chemical stability. A relatively simple recycling or reutilizing process of both the polystyrene foam and the solvent is also disclosed. The solvent comprises at least one member selected from the group consisting of such a glycol ether compound as diethylene glycol dimethyl ether, diethylene glycol diethyl ether or dipropylene glycol dimethyl ether, and such a fatty acid dialkyl ester compound as dimethyl succinate, dimethyl glutarate or dimethyl adipate. The method comprises first dissolving the polystyrene foam in the solvent, and then (1) distilling the obtained solution at a temperature at which polystyrene does not decompose to separate the solvent from polystyrene, (2) precipitating polystyrene from the obtained solution by adding water to the solution, or (3) precipitating polystyrene from the obtained solution by cooling the solution to a temperature lower than the temperature at which polystyrene dissolves.

U.S. Pat. No. 5,462,233 describes a process for recovering recyclable expanded particles from expanded particle moldings including expanded particles of a synthetic resin coated with thermoplastic resin (interfacial material) whose melting point is lower than that of the synthetic resin of the expanded particles or whose solubility is different from that of the synthetic resin of the expanded particles. The process includes the steps of softening or melting the interfacial material by heating or dissolving it with a solvent, and separating the expanded particle molding into individual particles by applying a shearing force thereto under circumstances such that the bond strength among the expanded particles in the molding is weakened.

A common feature among the prior art procedures for recovering materials from expanded polymeric materials is the use of solvents in compacting the expanded polymer. However, the use of solvents is undesirable in many respects. First, the use of solvents in general increases the cost of the recovery operation. Second, most solvents require special handling during the process and must be disposed of as hazardous waste following use in the process. Third, the use of solvents may result in the generation of hazardous gases. Fourth, the use of solvent increases the length of the process because recovery of the material from the solvent requires additional processing steps and apparatuses as noted in the patents discussed above. This is very significant in that the existing processes are not able to handle sufficient volume to keep up with the amount of expanded polymer waste being generated. Fifth, the solvents themselves may chemically interact with the material being recovered, thereby adversely modifying the properties of the material and thus limiting the utility of the recovered material in the manufacture of recycled products.

It would thus be desirable to develop a simple and cost effective process for recovering polymer material in particle form from expanded polymer.

SUMMARY OF THE INVENTION

It is thus an object of the present invention to obtain a simple, cost-effective and speedy process for recovering polymeric particle materials from expanded polymers. It is a further object of the invention to obtain a process for recovering polystyrene from expanded polystyrene.

It is a still further object of the invention to obtain a process of recovering polymer materials from expanded polymers in a mechanical process that is free of the use of any solvents in the recovery process.

These and other objects are achieved by the present invention, which achieves a process for recovering polymer materials from expanded polymer materials by grinding/compacting the expanded polymer materials in the presence of hot air and ionized air. The polymer of the expanded polymer is recovered in particle form, and is suitable for reuse in manufacturing recycled products. These and other objects are also achieved by the invention, which achieves an apparatus for carrying out the process of the invention.

The invention employs mechanical procedures for recovery of the polymer material, and thus avoids the use of chemical procedures, i.e., the use of solvents, and the problems associated therewith as discussed above.

DETAILED DESCRIPTION OF PREFERRED EMBODIMENTS

Figure 1:
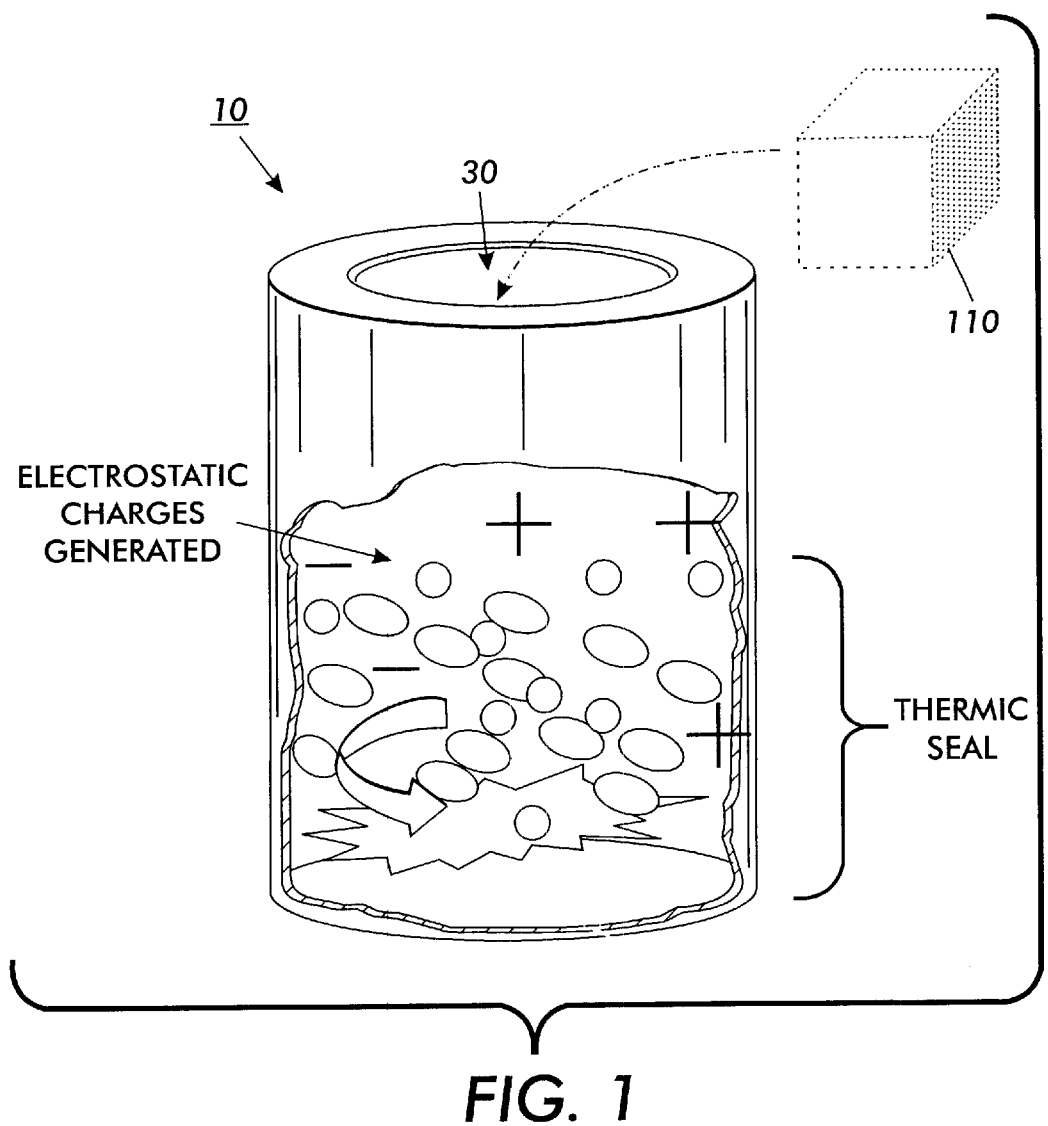
FIG. 1 illustrates electrostatic charges generated by expanded polystyrene during grinding in a grinding chamber.

It should be understood that the invention may be used to recover any type of thermoplastic polymers in the form of particles from the expanded form of such thermoplastic polymers. For example, the expanded thermoplastic polymers may include, for example, polyethylene, polypropylene, polystyrene and the like. However, the invention is most applicable in recovering polystyrene polymer in particulate form from expanded polystyrene. Expanded polystyrene is a material most commonly used in packaging materials. The invention is thus explained below with respect to the preferred embodiment relating to the recovery of polystyrene polymer in particulate form from expanded polystyrene, but should be understood to be readily modified for applicability (for example merely by modifying the temperature in the grinding chamber) to recovery of other expanded thermoplastic polymers.

The invention will be explained with reference to the drawing figures as appropriate.

Figure 2:
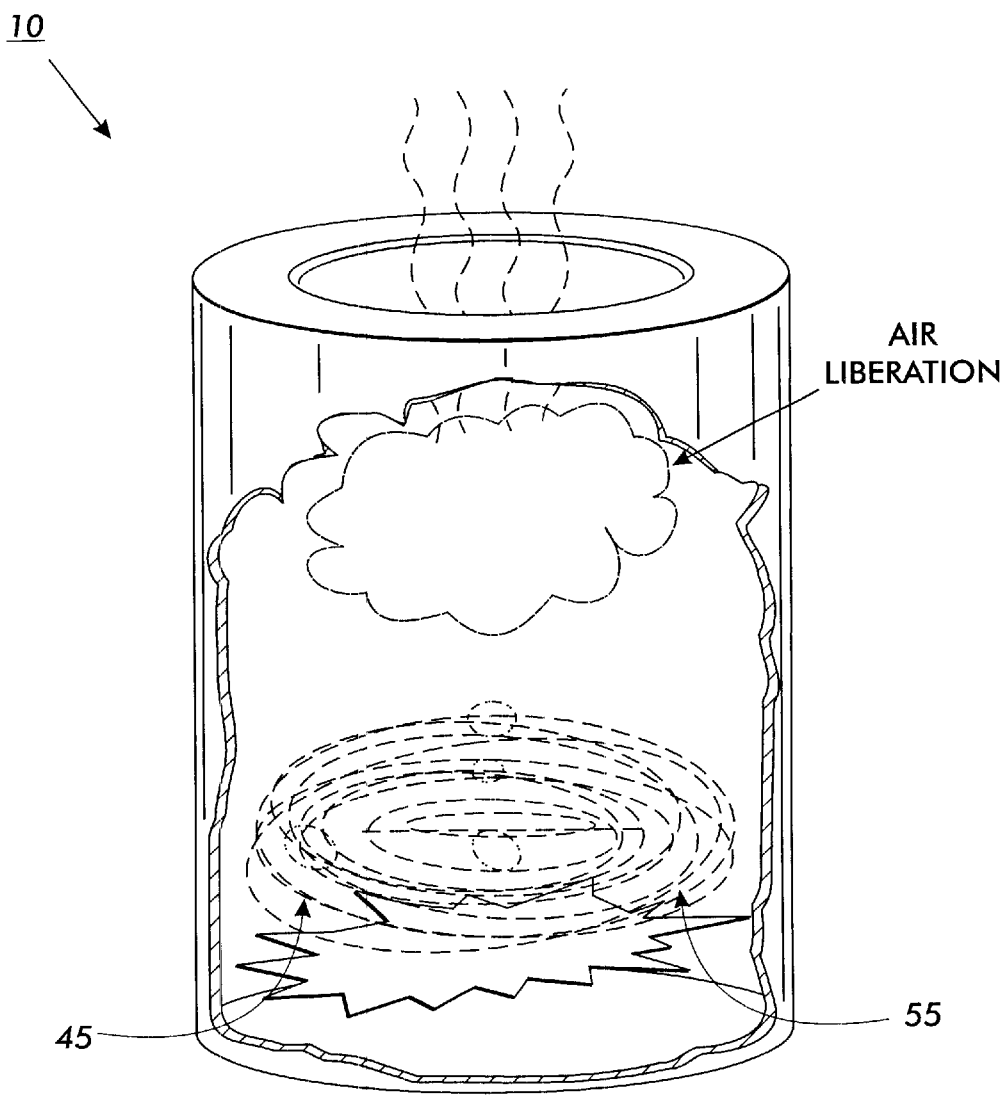
FIG. 2 illustrates the addition of ionized air into the grinding chamber to control the electrostatic charge generation and liberate air form the expanded polystyrene.

In the process of the invention, expanded thermoplastic polymer 110 to be treated in the process of the invention is first introduced into a grinding chamber 10. The expanded thermoplastic polymer may be in any form, including, for example, used packaging, etc. Grinding chamber 10 shown in FIGS. 1 and 2 is best suited for batch processing of expanded thermoplastic polymer, although continuous processing is also possible.

The expanded thermoplastic polymer may be introduced into the grinding chamber through one or more entry passages provided into the grinding chamber. As shown in FIG. 1, the entry passage may most conveniently be an opening 30 in the top of the grinding chamber. Such entry passages may optionally be sealable, if desired, so that the entry passages can be closed during batch processing within the grinding chamber.

There is no particular size limitation upon the capacity of the grinding chamber. However, from an efficiency standpoint in terms of processing time, the grinding chamber preferably has a size capacity of from 1 to 1,000 m$^3$, preferably 1 to 100 m$^3$.

The grinding chamber includes grinding components therein, but may have any suitable design known in the art for effecting grinding of the expanded thermoplastic polymer. That is, any conventional grinder, granulator, pulverizer, etc., that reduces the size of a material can be used. The device needs to be capable of mechanically compacting the expanded polymer material down to largely individual particles of the polymer, liberating air from the expanded polymer material as a result.

A suitable grinding chamber may include, for example, an agitator equipped with plural propellers rotated via a motor. In addition, the grinding chamber inside wall may include many projections that assist in the grinding as the propellers are rotated. The grinding chamber may also comprise a system that incorporates a plurality of gears having teeth thereon which grind the expanded polymer.

Grinding of the expanded polymer material in the grinding chamber is conducted under an elevated temperature. Preferably, the temperature during grinding is at least equal to about the melting point of the expanded polymer material being ground. Polystyrene (specific gravity of 1.04–1.08, in g/gm$^3$, at 23° C.) has a melting point of 90 to 100° C., polypropylene (specific gravity of 0.85–0.91, in g/gm$^3$, at 23° C.) has a melting point of about 168° C., low density polyethylene (specific gravity of 0.914–0.930, in g/gm$^3$, at 23° C.) has a melting point of about 105° C., and high density polyethylene (specific gravity of 0.94–0.96, in g/gm$^3$, at 23° C.) has a melting point of about 130° C. Thus, for grinding/compacting of expanded thermoplastic materials, the grinding/compacting is conducted at an elevated temperature of from, for example, 90 to 200° C. For grinding/compacting of expanded polystyrene materials, the grinding/compacting is conducted at an elevated temperature of from, for example, 90 to 120° C.

The elevated temperature in the grinding chamber may be achieved by any suitable means known in the art, including, for example, heating of the grinding chamber with heaters or heat exchangers. Preferably, heating to the elevated temperature is achieved by introducing heated gas 45 heated to the desired temperatures discussed above into the grinding chamber. The heated gas is most preferably air, although other gases may be used, including steam, etc. The heated gas is preferably introduced through one or more inlet passages located at a bottom portion of the grinding chamber as illustrated in FIG. 2. An upward flow of the gas through the grinding chamber assists in removing air liberated from the expanded polymer material being ground from the grinding chamber. The flow rate of the heated gas is not particularly limited, but from the standpoint of heating and cost efficiency, a flow rate of from 1 to 5,000 m$^3$/min may be used. The heated gas exits the grinding chamber through one or more outlet passages preferably located near a top portion of the grinding chamber. Exiting gas may either be vented or reheated and recycled back through the process.

A major problem encountered with the mechanical grinding of the expanded polymer material in the grinding chamber is the high tendency of such material, particularly expanded polystyrene, to develop an electrostatic charge during the grinding as a result of the contact between the materials and contact with the grinding elements. The generation of electrostatic charges by grinding is shown in FIG. 1. This is problematic because the generation of such charges causes the polymer materials to adhere together and/or to adhere to the grinding chamber and grinding elements, thereby making it very difficult to compact the material down to small particle size.

To suppress the generation of electrostatic charges and enable the successful compaction of the expanded polymer materials in the grinding chamber, the inventors have found that the introduction of ionized gas 55 into the grinding chamber during grinding achieves such result. The type of ionized gas is not limited, but ionized air is most preferred. The gas may be ionized by any suitable technique known in the art.

The ionized gas is also preferably introduced into the grinding chamber through one or more inlet passages located at a bottom portion of the grinding chamber as shown in FIG. 2. Again, an upward flow of the gas through the grinding chamber assists in removing air liberated from the expanded polymer material being ground from the grinding chamber. The flow rate of the ionized gas through the grinding chamber is not particularly limited, but a flow rate of from 1 to 5,000 m$^3$/min, more preferably of from 100 to 3,000 m$^3$/min, may be used. The gas exits the grinding chamber through one or more outlet passages preferably located near a top portion of the grinding chamber. Exiting gas may either be vented or reionized and/or heated/reheated and recycled back through the process.

In an embodiment of the present invention, the ionized gas may be heated to the temperatures discussed above for the heated gas, thereby also providing the necessary heating of the grinding chamber and eliminating the need for the introduction of a separate heated gas in the process. Thus, no separate flow of heated non-ionized gas or other heating methods of the grinding chamber would be required in this embodiment.

Air liberated from the expanded thermoplastic polymer material during grinding is removed from the grinding chamber through one or more exit passages. As shown in FIG. 2, the exit passages are preferably located at a top portion of the grinding chamber. The air removed from the grinding chamber may simply be vented to the atmosphere as the process is environmentally friendly, or it may be collected and recycled through the grinding chamber as the heated gas or the ionized gas.

Grinding is preferably continued for a sufficient period of time to compact the expanded thermoplastic polymer down to a desired particle size. A preferred end particle size is, for example, less than 10 mm in diameter, more preferably less than 5 mm in diameter, and most preferably less than 3 mm in diameter. In order to achieve such result, grinding in a batch process is continued for a period of from, for example, 1 to 180 minutes, more preferably from 1 to 60 minutes.

The obtained particles are preferably removed from the grinding chamber following grinding through one or more exit passages of the grinding chamber. In a preferred embodiment of the invention, the particles are preferably passed through a sizing device, for example a sieve, screen, vibrating screen, etc., so that the particles may be properly sized. This results in a properly sized thermoplastic polymer particles. Particles not yet meeting the size requirements are preferably recycled back into the grinding chamber for further grinding, with or without fresh expanded thermoplastic polymer material.

As noted above, grinding chamber 10 shown in FIGS. 1 and 2 is best suited for batch processing of expanded thermoplastic polymer. However, it should be understood that the invention may also be practiced in a continuous manner using a grinding apparatus more appropriate for continuous grinding. For example, reference is made to the continuous grinding apparatus of U.S. Pat. No. 5,595,349, incorporated herein by reference. Ionized and hot air can be introduced into the grinding zone of such an apparatus at the same rates as described above. In the continuous embodiment, expanded thermoplastic polymer feed would continuously be fed into the grinding chamber and the ground particles continuously withdrawn from the grinding chamber.

The process and apparatus of the invention provide a quick and cost-effective mechanical process for compacting expanded polymers, particularly expanded polystyrene. The process and apparatus avoid the use of solvents in compaction of the expanded polymers, i.e., the process is conducted free of solvents, thereby avoiding the problems associated with the use of such solvents. The end particles obtained from the process of the invention may be recycled/reused in making new products, including, for example, expanded products such as packaging, etc.

What is claimed is:

1. A process for recovering thermoplastic polymer particles from an expanded thermoplastic polymer material, the process comprising grinding the expanded thermoplastic polymer material in a grinding chamber under elevated temperature, and introducing ionized gas into the grinding chamber during the grinding, thereby obtaining the thermoplastic polymer particles.

2. The process according to claim 1, wherein the ionized gas is ionized air.

3. The process according to claim 1, wherein the elevated temperature is achieved by introducing heated air into the grinding chamber.

4. The process according to claim 3, wherein the heated air has a temperature of from 90 to 200° C.

5. The process according to claim 1, wherein the elevated temperature is achieved by heating the ionized gas to a temperature of from 90 to 200° C.

6. The process according to claim 1, wherein the ionized gas is introduced into a bottom portion of the grinding chamber, and air liberated from the expanded thermoplastic polymer is removed from a top portion of the grinding chamber.

7. The process according to claim 1, wherein the process is a batch process.

8. The process according to claim 1, wherein the process is a continuous process in which additional expanded thermoplastic polymer material is continuously fed into the grinding chamber and the thermoplastic polymer particles are continuously removed from the grinding chamber, the ionized gas being fed into a grinding zone of the grinding chamber.

9. The process according to claim 1, wherein the expanded thermoplastic polymer is expanded polystyrene.

10. The process according to claim 1, wherein the ionized gas exiting the grinding chamber is recycled back into the grinding chamber following reionization.

11. The process according to claim 1, wherein the process further comprises subjecting the thermoplastic polymer particles to sizing and recycling particles of too large a size back into the grinding chamber.

12. The process according to claim 1, wherein the thermoplastic polymer particles obtained have a diameter of less than 5 millimeters.

13. The process according to claim 1, wherein the process is free of inclusion of any solvent in the process.

* * * * *